United States Patent [19]
Johnson et al.

[11] 3,723,851
[45] Mar. 27, 1973

[54] BEVERAGE MIXER AND DISPENSER

[75] Inventors: Dale W. Johnson; Robert B. Grounds; Donald C. Langford, all of Phoenix, Ariz.

[73] Assignee: D. B. F. D. Enterprises, Phoenix, Ariz.

[22] Filed: Mar. 15, 1971

[21] Appl. No.: 124,019

[52] U.S. Cl. .................................. 272/132, 137/609
[51] Int. Cl. .............................................. B67d 5/60
[58] Field of Search........222/129.1, 145, 144.5, 129, 222/132; 137/602, 604, 607, 609, 625.17

[56] References Cited

UNITED STATES PATENTS

| | | | |
|---|---|---|---|
| 1,370,759 | 3/1921 | Oliver | 222/144.5 X |
| 2,888,040 | 5/1959 | Terwilliger | 222/144.5 X |
| 2,792,018 | 5/1957 | Turak | 137/604 |

Primary Examiner—Robert B. Reeves
Assistant Examiner—James M. Slattery
Attorney—Eric P. Schellin et al.

[57] ABSTRACT

A beverage mixer and dispenser utilizing a bottled water holding cabinet which supports a water container and a plurality of flavor liquid containers; all of said containers being disposed for gravity-responsive delivery of liquids therefrom; and a dispensing and mixing valve below all of said containers; said valve having a rotatable and reciprocable valve member which may be rotated to any one of several selective positions communicating with any one of said flavor liquid containers; and said valve member may be reciprocably actuated against spring pressure to cause concurrent communication of said water container and one of said flavor liquid containers with a common outlet, of said valve, through which the water and a selected flavor liquid may be mixed and dispensed to a drinking receptacle.

6 Claims, 5 Drawing Figures

Patented March 27, 1973

INVENTORS.
DALE W. JOHNSON
ROBERT B. GROUNDS
DONALD C. LANGFORD

BY

Drummond, Phillips & Cates
ATTORNEYS

Patented March 27, 1973

Patented March 27, 1973 3,723,851

Patented March 27, 1973
3,723,851
4 Sheets-Sheet 4
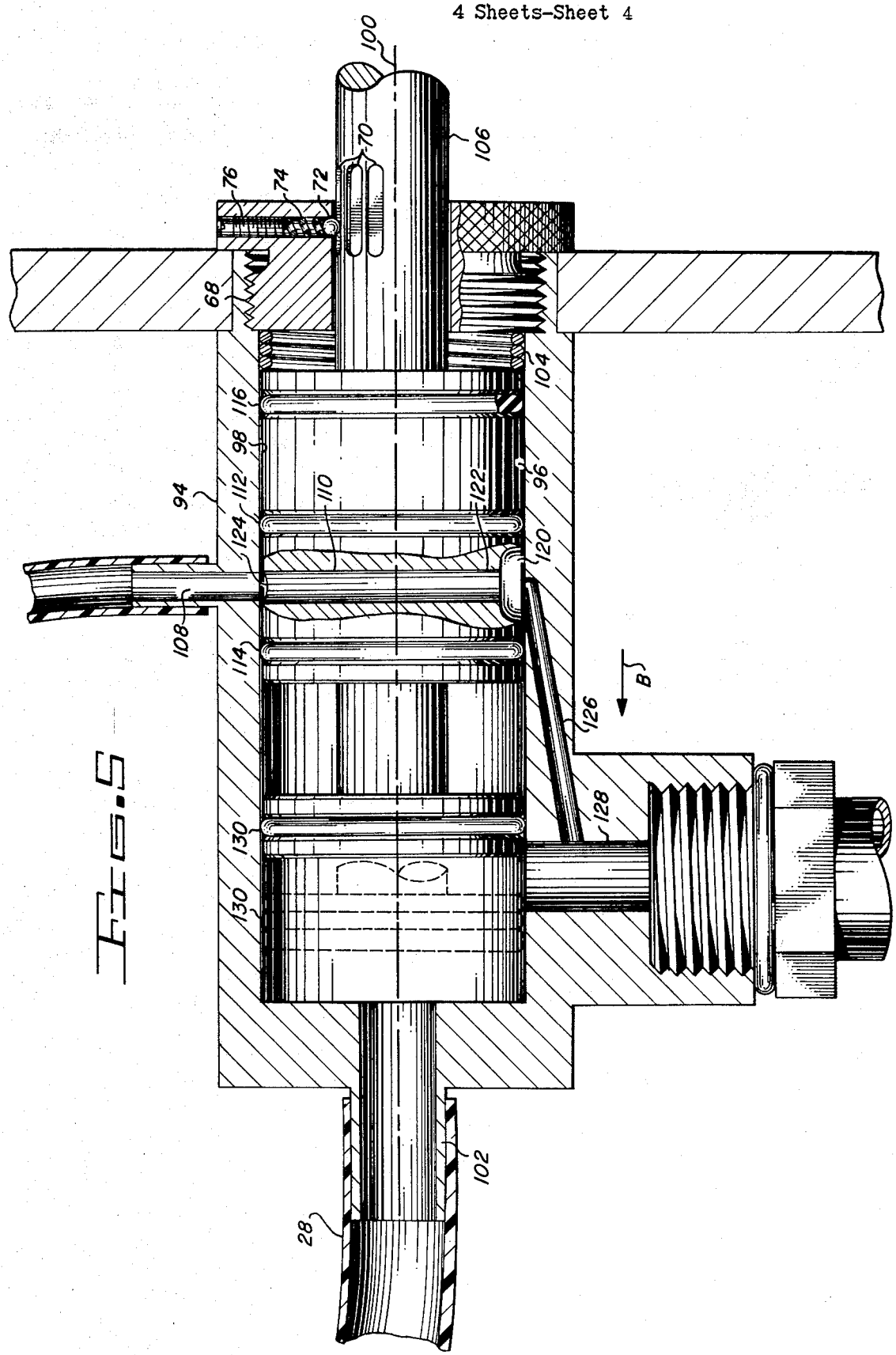

BEVERAGE MIXER AND DISPENSER

Various drink mixing devices have utilized carbonated water and/or various flavoring liquids to produce flavored drinks and many of the drink mixing and dispensing apparatus of the prior art have been quite complicated and expensive initially to install and subsequently to operate and maintain.

Various hot and cold water beverage dispensing devices have been used in connection with bottled water cabinets; however, many of these require manual mixing of drink ingredients with hot or cold water dispensed by such bottled water dispensing apparatus. Many conventional bottled water cabinets contain heaters which heat the water so that the hot water may be dispensed into a cup wherein dehydrated instant coffee or other similar beverages may be dissolved and mixed manually to produce a desired beverage. Such beverages are of necessity produced according to the user's judgment and oftentimes a drink may be either too strong or too weak with relation to the various ingredients including flavoring or the like. Many prior art drink dispensers and mixers which properly proportion water and flavoring liquids are quite complicated as well as expensive.

In accordance with the present invention, a bottled water cabinet supports a water container and a plurality of flavor containers, all of which are disposed to deliver liquid in response to gravity, and wherein a single valve is provided with a rotatable member which selectively operates to select a predetermined flavoring liquid, while reciprocation of the valve member causes dispensation of a mixture of water and flavoring liquid into a drinking receptacle. The valve structure of the invention includes a resilient means, such as a spring, tending to hold the reciprocable valve member of the invention in one position normally to hold the valve closed relative to a common outlet through which mixed drinks are dispensed to a drinking receptacle. The valve member of the invention being reciprocable and rotatable provides very simply for two functions, one of which is a complete shut-off operation between the water and flavor liquids, and the common outlet of the valve, while the other function relates to rotation of the valve member selectively to index with any one of a plurality of flavor liquid container outlets so as to predetermine the flavor of the mixed drink to be produced when the valve member is reciprocably moved to open position with respect to both the flavoring liquid and the water. The invention also involves very simple flow capacity regulation of water and flavoring liquid, so that under normal gravitational force, the liquids are properly proportioned accurately to produce a desired flavored drink.

The valve member of the invention is reciprocably and rotatably mounted in a valve housing and an elongated detent means is disposed for maintaining the valve member indexed with any desired flavor liquid container during reciprocable operation of the valve member in the housing for opening and shutting of the valve with relation to the dispensing of water and a flavoring liquid into a drinking receptacle. The invention includes two species of the valve mechanism, one of which comprises a control knob having a selector pointer and wherein the control knob may be forced inwardly against compressive force of a spring to move the valve member to open position, and another species of the dispensing valve is such that the control knob must be pulled outwardly relative to the housing to move the valve member against spring pressure to an open position for dispensing water and a flavor liquid to a drinking receptacle.

The specific features of the valve mechanism of the invention employ peripheral seals on the valve member operating in a bore of the valve housing and the seals are spaced apart axially of the valve member so as to provide for shutoff of the flavor liquid as well as the water when the valve member is reciprocated toward and away from open position.

Accordingly, it is an object of the present invention to provide a very simple and economical beverage mixer and dispenser which may employ structure of a conventional bottled water cabinet.

Another object of the invention is to provide a novel beverage mixer and dispenser utilizing a bottled water cabinet wherein a water container and a plurality of flavor liquid containers are all disposed for gravity-responsive delivery through a manually operable selector valve below the containers for mixing and dispensing water and a flavor liquid to produce a beverage.

Another object of the invention is to provide a very simple beverage mixer and dispenser which operates by gravity for accurately proportioning water and flavor liquid to accurately produce a desired beverage.

Another object of the invention is to provide a beverage mixer and dispenser having a novel valve means for rotatably selecting any one of a plurality of flavoring liquids and which is also reciprocably operable to act as a shutoff valve for controlling concurrent flow of water and a flavor liquid for the mixing and dispensation of the water and flavor liquid into a beverage receptacle.

Another object of the invention is to provide a novel beverage mixing and dispensing valve wherein a rotatable valve member is provided with a plurality of elongated detents generally axially parallel with the valve member so as to permit detent operation of the rotatable valve member in an indexed relation with any one of a plurality of flavored liquid inlets; and whereby the valve member may be reciprocable axially to operate as a dispensing shutoff valve while the elongated detents maintain alignment of the valve member so as to dispense a desired flavoring liquid when the valve member is reciprocated to open the valve and dispense the flavoring liquid in a mixed relationship with water to produce a desired beverage.

Further objects and advantages of the invention may be apparent from the following specification, appended claims and accompanying drawings, in which:

FIG. 5 is a view similar to FIG. 3, but showing a modification of the valve mechanism of the invention.

Figure 1:
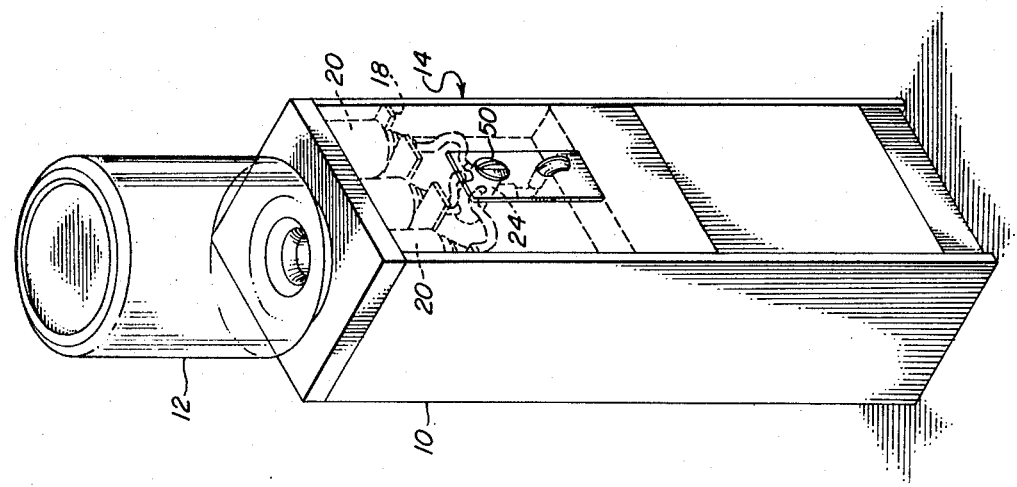
FIG. 1 is a perspective view of a beverage mixer and dispenser of the invention showing the invention in combination with a bottled water dispensing cabinet and showing portions thereof in open position to expose a plurality of flavor liquid containers therein as well as the dispensing valve mechanism of the invention.

As shown in FIG. 1 of the drawings, the invention may utilize a conventional bottled water cabinet 10, supporting a conventional bottle 12, which constitutes the water container in accordance with the present invention.

In the cabinet 10, the invention comprises an assembly of flavor liquid containers 14, said assembly comprising a frame 16, having a shelf 18 on which flavor liquid containers 20 are supported in inverted position so that they may dispense flavor liquid therefrom in response to gravity, as will be hereinafter described in detail. The frame 16 is provided with a front panel 22 on which a valve housing 24 of a dispensing and mixing valve of the invention is mounted. The valve housing 24, is provided with a water inlet 26, communicating with a tube 28, which extends from a reservoir into which water moves by gravity from the water bottle 12 or water container 12. Secured to a common outlet of the valve housing 24 is a conduit 30, having a pouring spout 32, adapted to deliver a mixture into a drinking receptacle as will be hereinafter described.

The cabinet 10 is provided with a removable front cover 34, adapted to enclose the flavor liquid containers and to enclose the front side of the cabinet 10. The cover 34 is readily openable in order to service the flavor liquid containers 20, either to refill them or to change them in accordance with preferred practice.

Figure 2:
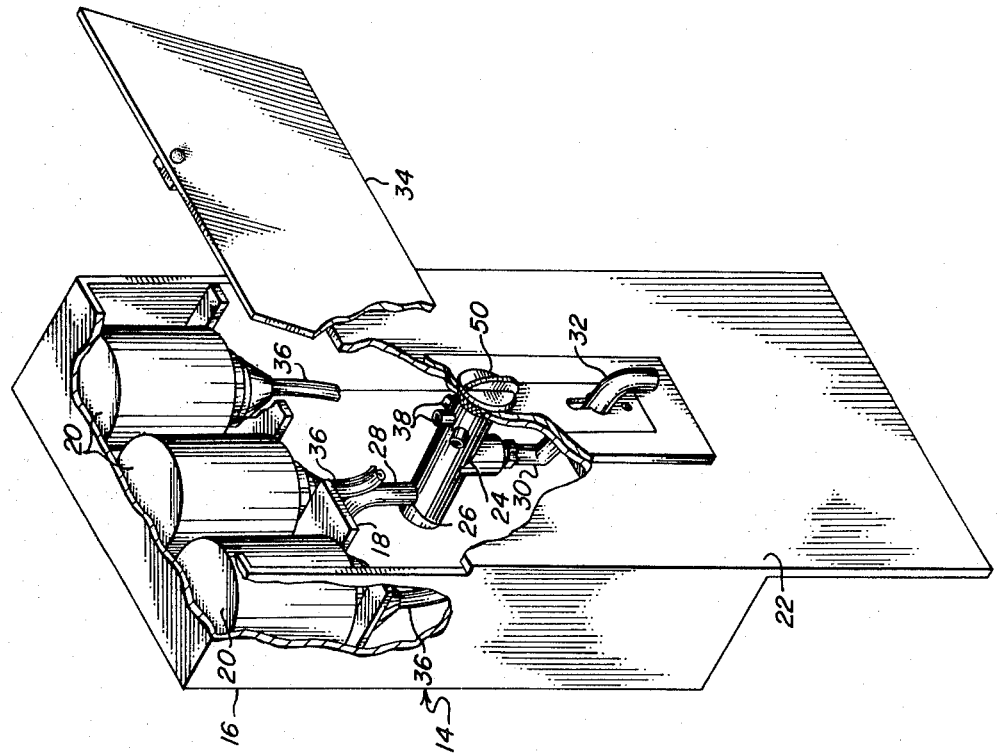
FIG. 2 is an enlarged view similar to FIG. 1, but showing the flavor liquid containers and dispensing valve mechanism of the invention removed from the bottled water cabinet.
Figure 4:
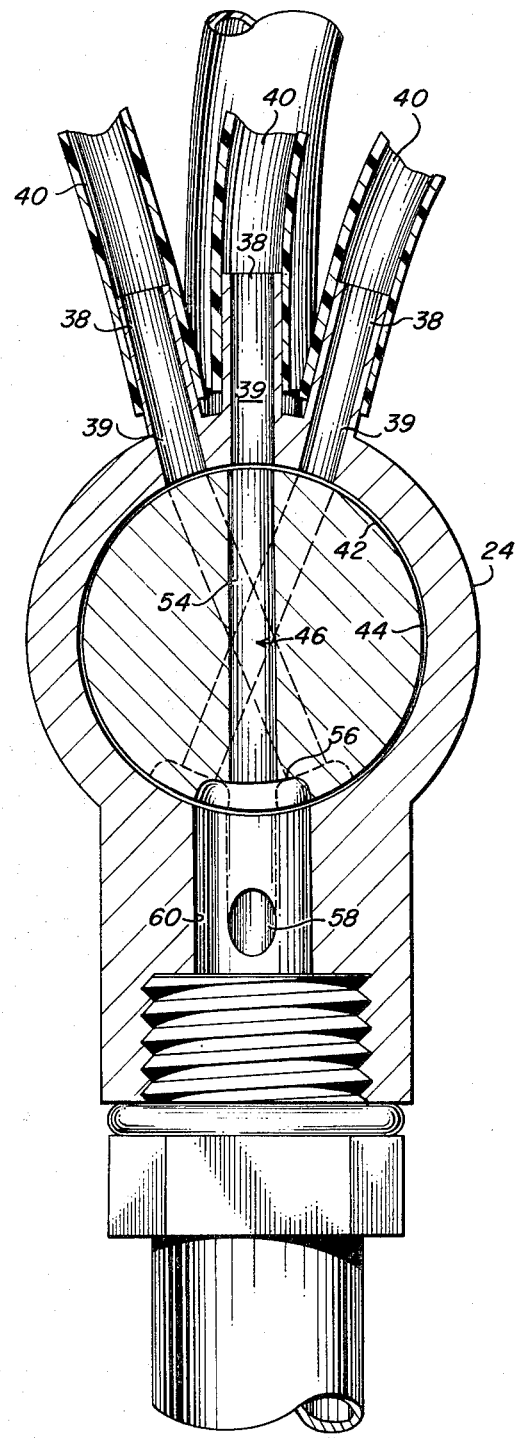
FIG. 4 is a sectional view taken from the line 4—4 of FIG. 3, showing by broken lines, varying index positions of the valve member of the invention relative to the housing thereof, and relative to a plurality of flavor liquid inlets in the valve housing.

The flavor liquid containers 20, are each provided with a liquid outlet 36, which communicates with one of a plurality of corresponding valve housing inlets 38, all as shown best in FIGS. 2 and 4 of the drawings. As shown in FIG. 4 of the drawings, flexible hoses or any other suitable conduits 40 connect outlets 36 of the flavor liquid containers 20 with the respective valve housing inlets 38.

As shown in FIG. 4 of the drawings, these inlets 38 communicate with a circular in cross-section bore 42 in the housing 24 and the inlets 38 are disposed in an arcuate row relative to each other at their communication with the bore 42.

Figure 3:
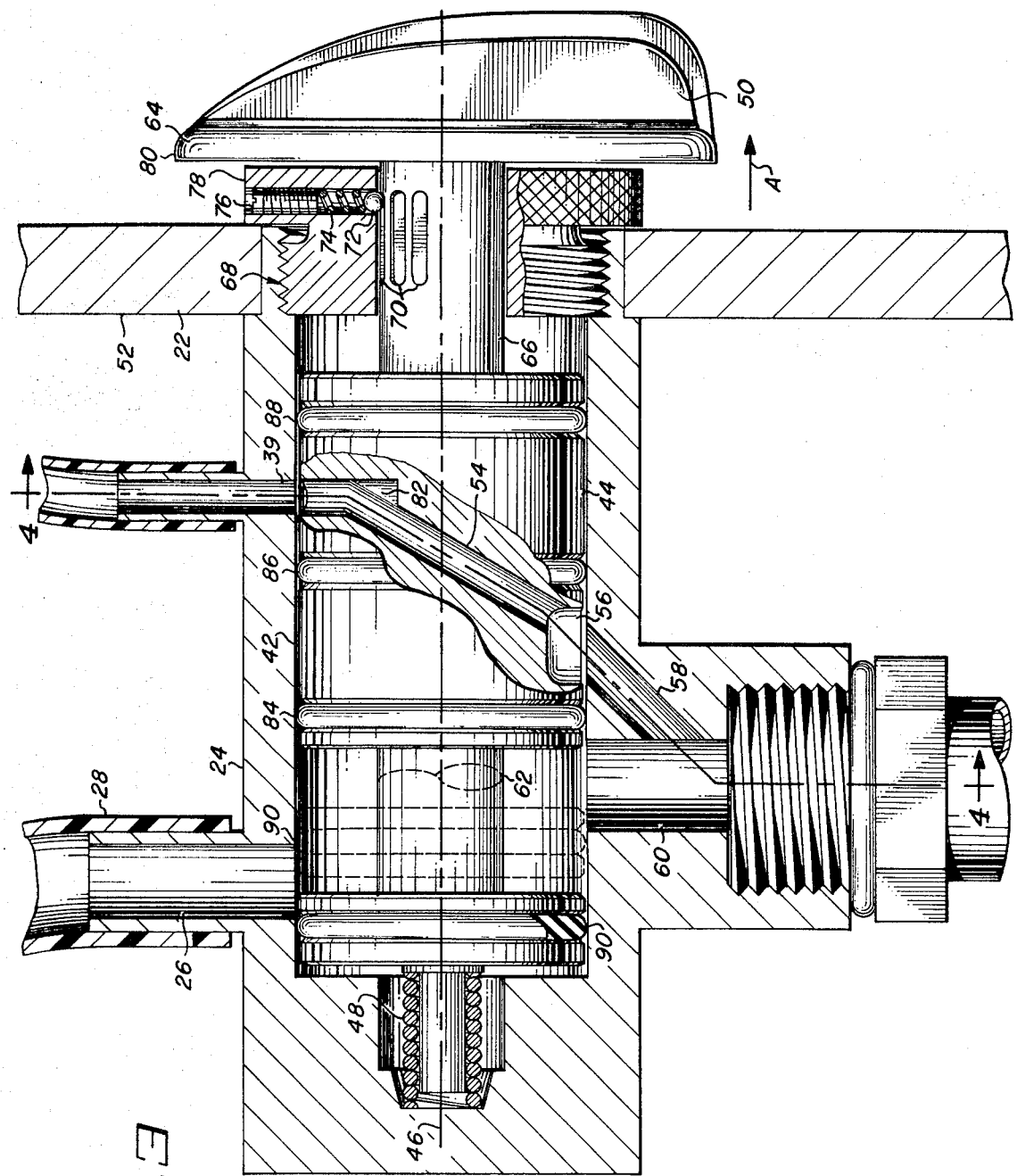
FIG. 3 is an enlarged axial sectional view of the beverage mixing and dispensing valve mechanism of the invention showing by broken lines a varying position of a portion of the valve.

Referring to both FIGS. 3 and 4, it will be seen that the valve member 44 is circular in cross-section and is rotatable and reciprocable in the bore 42.

As indicated by a centerline 46, in FIG. 3 of the drawings, the bore 42 has a central longitudinal axis. This axis 46 is concentric with the bore 42 and the movable valve member 44 is rotatably mounted about the axis 46. The valve member 44 is an elongated generally cylindrical spool type valve member and it is reciprocably mounted to move back and fourth longitudinally along the axis 46, as will be hereinafter described.

A coiled compression spring 48, shown in compressed position in FIG. 3 of the drawings, tends to force the valve member 44 in a direction of an arrow A in FIG. 3 of the drawings to move a control knob 50 in connection with the valve member 44, in a direction away from the front face 52 of the cover member 22 hereinbefore described in connection with FIG. 2 of the drawings.

The valve member 44 is shown in a dispensing position relative to liquid passages in the housing 24, in FIG. 3 of the drawings as will be hereinafter described.

As shown in FIG. 4 of the drawings, the valve member 44 is provided with a port or passage means 54, which extends diagonally from side to side of the valve member 44 as indicated in FIG. 3 of the drawings. The port extends diagonally with respect to the longitudinal axis of the valve member 44 and extends from side to side substantially diametrically in relation to the valve member 44 as shown in FIG. 4 of the drawings.

The valve member 44 is provided with an arcuate slot 56, equal in angular spread to the arcuate row of inlet ports 39 communicating directly with the inlets 38 of the housing 24 as hereinbefore described in connection with FIG. 4 of the drawings. The arcuate slot 56 communicates with a flavor liquid outlet passage 58 in the housing 24 and this passage 58 communicates with a common outlet passage 60 in the housing 24. The inlet 26, communicating with the water conduit 28 hereinbefore described, communicates directly with the interior of the bore 42 of the housing 24 and communicates with an open spool passage 62 in the valve member 44 when in the position shown in FIG. 3 of the drawings. The valve member 44 carries an index knob 64 which is manually operable and which may be manually rotated so as to index the port 54 with any one of the inlet ports 39 while the outlet port 54 communicates with the slot 56, which in turn communicates with the flavor liquid outlet passage 58 hereinbefore described.

The valve member 44 is provided with a reduced diameter shank 66 rotatably mounted in a bushing 68 in the end of the valve housing 24. The shank 56 is provided with a plurality of elongated detent slots 70, for use in indexing the port 54 with any one of the inlets 39, as will be hereinafter described.

The elongated recessed detents 70 correspond in number and angular displacement to the inlet ports 39, shown in FIG. 4 of the drawings. A spring loaded detent ball 72, is urged by a spring 74 to engage in any one of the slots 70, and a plug screw 76, secures the spring in a peripheral flange 78 of the bushing 68 hereinbefore described.

When the control knob 50 at its pointer end is directed toward a desired flavor designation on the front of the cabinet, a respective detent slot 70 will be engaged with ball detent member 72 so that the detent mechanism aligns the port 54 with a desire to flavor liquid inlet port 39 in the housing 24. The knob 50 is then pressed inwardly against the spring 48 a sufficient distance to establish communication of the open inlet end 82 of the port 54 with the respective inlet port 39 and at the same time the slot 56 is brought into registry with the flavor liquid outlet 58. Concurrently, the open spool portion of the valve member 44 provides intercommunication between the water inlet 26 and the common outlet 60. At this time, liquid is allowed to gravitate from the water container 12 and from one of the flavor liquid containers 20 so as to mix in the common outlet 60 and the conduit 30 as well as the spigot 32 which is disposed to dispense the mixed drinks downwardly into a drinking receptacle.

The valve member 44 is provided with three spaced-apart peripheral seals 84, 86 and 88 which sealingly slide and rotate in the bore 42 of the housing 24. It will be seen that the diagonal disposition of the port 54 extending from side to side and diametrically through the valve member 44 extends from one side of the seal 86 to the opposite side thereof, so that the inlet 82 is disposed between the seals 86 and 88, and the outlet slot 56 is disposed between the intermediate seal 86 and the seal 84 adjacent to the open spool portion of the valve member.

A spool valve seal 90 is similar to the peripheral seals 84, 86 and 88 and all of these seals are disposed in suitable grooves in the periphery of the valve member 44. The seal 90 is disposed to be moved into the solid line position shown in FIG. 3 of the drawings for dispensing liquid and allowing water to flow through the spool valve area 62 of the valve member 44 as hereinbefore described.

When the knob 50 is released to shut off flow of a beverage, being mixed and dispensed to a beverage receptacle, the spring 48 compressibly forces the valve member 66 in a direction as indicated by an arrow A in FIG. 3 of the drawings, such that the seal 90 becomes disposed in a position as indicated by broken lines in FIG. 3 of the drawings shutting off flow of water from the inlet 26 to the common outlet 60. In this position, the open end 82 of the port 54 is moved out of index relation with the respective inlet port 39 and an area of the valve member between the seals 84 and 86 is disposed adjacent to the inlets 39, thereby shuting off flow of flavor liquid from a respective inlet port 39 to the flavor liquid outlet port 58 as hereinbefore described.

It will be seen that while valve member 44 may be rotated, so as to dispose the port 54 for conducting flavor liquid from any one of the inlet ports 39, the valve member 44 must also be reciprocated against compression of the spring 48 to the position shown in FIG. 3 of the drawings so that water and flavor liquid may concurrently be disposed to flow into the common outlet 60, and out through the spigot 32 and into a drinking receptacle.

The simple function of the valve of the invention permits selective flavor dispensation by rotation of the valve member 44, while axial movement of the valve member 44 when forced by the manual knob 50 in a direction opposite the arrow A causes the valve to open the hereinbefore described ports and allow a flavor liquid and water to flow in mixed relationship to produce a desired beverage for dispensation through the spigot 32 to a drinking receptacle.

In the modification, as shown in FIG. 5 of the drawings, a modified valve housing 94, is generally similar to the hereinbefore described valve housing 24, and a rotatable and reciprocal valve member 96 is similar to the hereinbefore described valve member 44. The housing 94 is provided with the bore 98, in which the valve member 96 is reciprocably and rotatably mounted.

The housing 94, at one end thereof, and in concentric relation to an axis 100 of the bore 98 is provided with a water inlet 102, which communicates with the hereinbefore described conduit 28, communicating with the water container 12.

A coil compression spring 104 is disposed in the housing 94 adjacent the bushing 68 and this compression spring 104 tends to move the valve member in a direction of an arrow B, as shown in FIG. 5 of the drawings, and accordingly, a control knob, such as the control knob 50, is fixed to the shank 106 of the valve member 96, so as to pull the valve member 96 in a direction away from the water inlet 102, in order to open the valve for dispensation of a flavor liquid as well as water in a manner as hereinbefore described.

In the modification as shown in FIG. 5, movement of the valve member 96 in the valve housing 94 is in an opposite direction to that as disclosed in FIG. 3 of the drawing.

The valve housing 94 is provided with a plurality of flavor liquid inlet ports 108, similar to the ports 39, as hereinbefore described in connection with FIG. 4 of the drawings.

The valve member 96 is provided with a diametrically extending port 110, which extends from one side of the valve member to the other, and in a direction at substantially right angles to the axis 100 of the valve member 96. This port 110 extends between an intermediate peripheral seal 112 and another seal 114. A third seal 116, is spaced from the seal 112, and an area intermediate, the seals 112 and 116, may be adjacent the inlets 108 when the compression spring 104 forces the valve member 96 toward a water inlet 102.

An arcuate slot 120, in the valve member 96, communicates with an outlet end 122 of the port 110 while an inlet 124 communicates with a flavor liquid inlet 108 in the housing 94.

The arcuate slot 120 is similar to the slot 56, hereinbefore described and communicates with a flavor liquid outlet port 126, which communicates with the interior of a common outlet port 128, similar to the common outlet port 60, shown in FIG. 3 of the drawings.

The valve member 96 is provided with a peripheral seal 130 at its end near the common outlet port 128, and this seal 130 is adapted to assume a broken line position as shown in FIG. 5 of the drawings, when the spring 104 forces the valve member 96 to a position towards the water inlet 102.

Water communicating with the inlet 102 is disposed only a few inches above inlet 102, and consequently the head pressure of the water is low and therefore is adequately resisted by compression of the spring 104 so as to maintain the seal 130 in the broken line position as shown in FIG. 5 of the drawings. When the control knob 50 is released the spring 104 projects the valve member 96 reciprocably a sufficient distance to dispose the seal 130 in the broken line position beyond the common outlet port 128. In this position, as hereinbefore described, an intermediate area of the valve member, between the seals 112 and 116, is disposed adjacent to the respective inlet ports 108, so as to prevent drainage of flavor liquid during a time when the valve member 96 is projected by the spring 104 toward the water inlet 102.

It will be appreciated that the springs 48 and 104 shown in FIGS. 3 and 5 respectively, perform an equivalent function, namely that of closing the valve after the valve has been reciprocably actuated manually by means of the control knob 50, as hereinbefore described. The detents 70 and 72 shown in FIG. 5 are similar to those shown in FIG. 3 of the drawings and operate in substantially the same way. The elongated detent slot 70 provides for the traverse of the shank 106, relative to the respective detent ball 72, during opening and closing action of the valve when the respective valve members 44 and 96 are reciprocably moved in the respective valve housings, manually and by means of the springs 48 and 104, hereinbefore described.

It will be obvious to those skilled in the art that various flavor liquids may be disposed in the containers 20, while water may be disposed in the container 12 and accordingly, gravity, acting to cause the flow of water and a flavor liquid concurrently, will provide for substantially uniform dispensation of the two liquids in proportion to the cross-sectional flow areas provided for each respective liquid. Therefore, mixing and proportioning of the water and the flavor liquid may be accomplished accurately to produce a desired drink, which may be dispensed through the spigot 32 when the operator rotates the control knob 50 to select the desired flavor, and actuates the valve member reciprocably in the respective housing, to open the valve relative to the water and the flavor liquid, which concurrently flow into the common outlet 128, and ultimately into a drinking receptacle, held below the spigot 32, by the operator of the control knob 50.

Various modifications of the invention may be resorted to without departing from the spirit thereof.

We claim:

1. In a beverage mixing and dispensing apparatus, the combination of: a cabinet; a plurality of flavor liquid containers; a water container; all of said containers supported by said cabinet and having liquid outlets adapted to permit delivery of liquid therefrom; a valve having a housing provided with valve inlets communicating with said liquid outlets; said housing having a bore; a cylindrical valve member rotatably and reciprocably mounted in said bore of said housing; said valve member having an axis of rotation substantially concentric with said bore; resilient means tending to reciprocate said valve member longitudinally along said axis of rotation in one direction in said bore; said housing having a common liquid outlet for delivery of mixed drinks to drinking receptacles; said valve inlets comprising a first valve inlet communicating with said liquid outlet of said water container; said valve inlets also comprising a plurality of second valve inlets communicating with said liquid outlets of said flavor liquid containers; port means disposed alternately to intercommunicate between any one of said second valve inlets and said common outlet when said valve member is reciprocably moved in said bore against force of said resilient means, said second valve inlet being arcuately spaced about said bore and adapted alternately to deliver liquid to said port means when said valve member is rotated in said bore to cause selective alignment of said port means with a respective second valve inlet; and valve elements on said valve member disposed to permit communication between said first valve inlet and said common outlet when said valve member is reciprocably moved in said bore against force of said resilient means, wherein said cylindrical valve member is provided with a peripheral portion movable in close proximity to said bore; three spaced-apart peripheral seals on said peripheral portion; said port means extending through said valve member from side to side between two of said three peripheral seals; a spool portion on said valve member; a pair of spaced-apart seals on said spool portion adapted to straddle said common outlet and open and close said first inlet, whereby communication is concurrently established between one of said flavor liquid containers and said water container and said common outlet when said valve member is forced axially in said bore against force of said resilient means.

2. The invention as defined in claim 1 wherein detent means is disposed to index said port means in said valve member with a selected one of said second valve inlets; and a manually rotatable and indexable knob fixed to said valve member.

3. The invention as defined in claim 2 wherein said detent means is axially elongated relative to said valve member in parallel disposition with the longitudinal axis thereof to allow reciprocation of said valve member in said bore while being indexed by said index means.

4. The invention as defined in claim 3 wherein said resilient means is disposed and tends to force said valve member in a direction to move said knob away from said housing.

5. The invention as defined in claim 3 wherein said resilient means is disposed and tends to force said valve member in a direction to move said knob towards said housing.

6. The invention as defined in claim 1 in which said port means extends diagonally through an intermediate one of said peripheral seals.

* * * * *